UNITED STATES PATENT OFFICE.

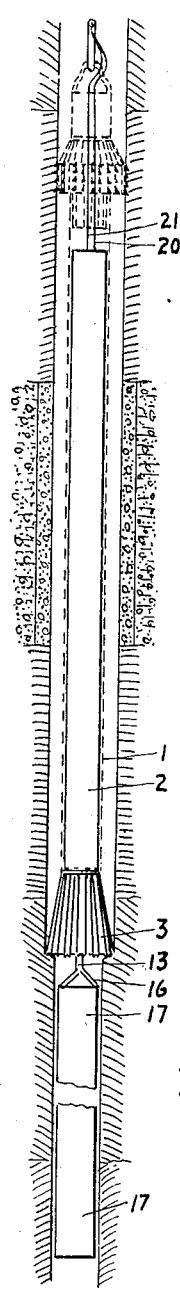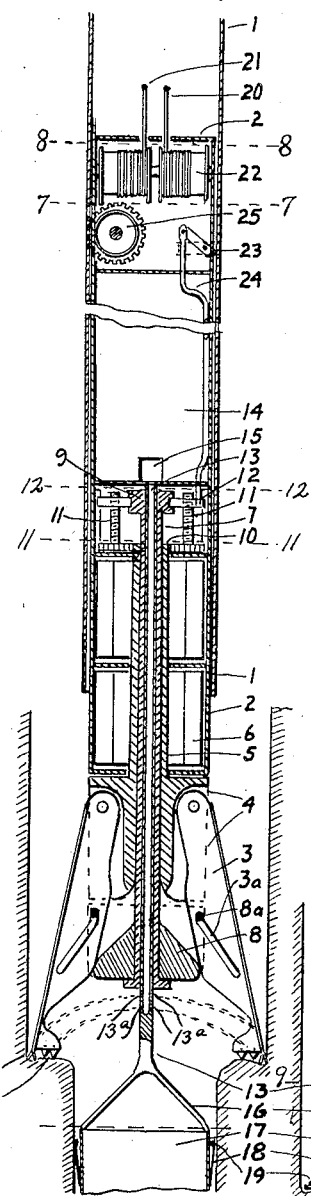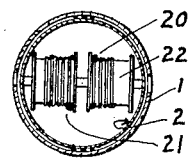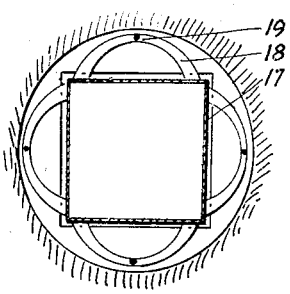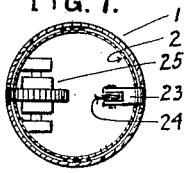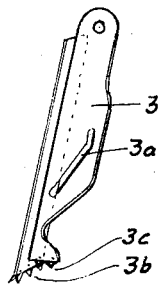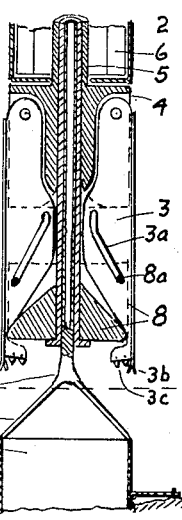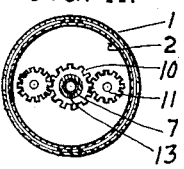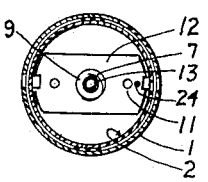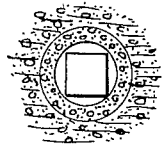

CLYDE S. CORRIGAN, OF NORWOOD, OHIO.

DEEP-WELL REAMER.

1,406,348. Specification of Letters Patent. Patented Feb. 14, 1922.

Application filed September 4, 1920. Serial No. 408,117.

*To all whom it may concern:*

Be it known that I, CLYDE S. CORRIGAN, a citizen of the United States, residing at Norwood, in the county of Hamilton and State of Ohio, have invented a new and useful Deep-Well Reamer, of which the following is a specification.

My invention is a departure from present methods of reaming, under-reaming or enlarging holes in the earth, in that the reaming is done by saws (instead of bits) cutting out the superfluous earth in pieces instead of grinding it up, the saws are provided with stone cutting teeth and direct connected to motors rotating at high speed, the entire machine and holding device is lowered in to the well, by means of a sustaining and power conveying cable.

Primarily, the multiple saw reamer was designed to make round the polygon shaped holes made by core sawing deep well machines shown in my patent application Serial #396392, filed July 15, 1920.

Second, to enlarge holes in water bearing or soft strata so that concrete casing may be used, thereby avoiding the necessity of casing all the way down from the surface with steel pipe.

Third, to under ream beneath steel pipe casing so it may be driven deeper and to do the reaming at any time, and independently of any drilling operations.

Fourth, to enlarge and clean out the bottom of oil or water wells, enlarge the footings of foundation piling, etc.

Variations of this machine may be used to enlarge holes in stone, wood and other materials.

With these and other objects in view a preferred form of construction of the machine is shown in the accompanying drawings in which like numerals refer to like parts throughout.

Fig. 1 reamer in a well.
Fig. 2 sectional view of reamer, saws spread.
Fig. 3 sectional view of reamer, saws closed.
Fig. 4 square hole made round and concrete casing.
Fig. 5 plan of saws spread.
Fig. 6 plan of saws closed.
Fig. 7 sectional plan at 7—7 Fig. 2.
Fig. 8 sectional plan at 8—8 Fig. 2.
Fig. 9 plan at 9—9 Fig. 3.
Fig. 10 isometric view of a saw.
Fig. 11 sectional plan at 11—11 Fig. 2.
Fig. 12 sectional plan at 12—12 Fig. 2.

Primarily the deep well reamer consists of a casing 1, held in place and kept from rotary motion in the well by a holding device such as shown in my patent application, Serial No. 408,119 of even date, entitled a holding device for deep well machines.

Within casing 1 and slidingly attached therein by spline members to prevent rotary motion with respect thereto, is casing 2.

Saws 3 are provided with a face member and a rib member, the rib member is pivotally attached in slotted head 4 of hollow splined shaft 5 and operated by motor 6 positioned in the lower part of casing 2.

Within hollow splined shaft 5 and rotated thereby is hollow shaft 7 provided with a spreader head 8 at its lower end and a lift flange 9 at its upper end.

At the upper end of shaft 5 is a gear wheel 10 which operates lift screws 11 which project through threaded holes in lift plate 12 in which lift flange 9 is positioned, thereby lifting shaft 7 with spreader head 8 and spreading saws 3 to the desired radius for reaming, the threads on lift screws 11 only extend to the height plate 12 is to be lifted. Within hollow shaft 7 is a hollow rod 13 the upper end of which is rigidly fastened to the bottom plate of tank 14, the lower end is solid and divided into stay rods 16 which support muck tank 17.

Within water tank 14 is regulator 15 to regulate the flow of water to hollow rod 13 radial holes 13ª—13ª near the bottom of rod 13 allow jets of water to play on saws 3 when open and rotating, when saws are closed the holes are closed by rod 7.

Muck receiving tank 17 should be the same shape and but slightly smaller than the well to be reamed, so that all segments of material cut loose by the saws will drop into muck tank and be conveniently lifted to the surface.

Indicator wings 18 are pivotally attached near the top of muck tank 17. They are of such shape as to move freely and guide the tank in the hole already reamed, but on reaching the part of hole not reamed are folded up against the tank and contact points 19 on said wings 18 press against plates on tank 17 to complete an electric circuit through control wires 20 to ring a bell at the surface and notify the operator.

Control wires 20 and power wires 21 are wound on reels 22 positioned in the upper part of casing 2, within reels 22 are springs to wind the wires on the reels when casing 2 is raised and allow them to unwind when casing 2 is lowered.

Casing 2 is held from sliding in casing 1 by clutch 23 the lip of which extends out of casing 2 and engages notches in casing 1. Casing 2 is released to gravitate to the work by lift plate 12 raising lift rod 24 and disengaging clutch 23 from casing 1.

When released by clutch 23 part of the weight of casing 2 and enclosed motors is sustained by spring clutch 25 with teeth engaging rack teeth in casing 1. The spring tension being such as to hold all the weight except what is required to make the saw teeth perform the cutting operations.

When the saws have advanced the reaming a certain predetermined distance or at the will of the operator, the power current is reversed, reversing motor 6 to close saws 3, drop rod 24 and cause clutch 23 to engage the next notch in casing 1 and hold the machine while being raised to the surface.

Rotary reaming machines are usually operated at slow speeds but in this reamer equipped with stone cutting saws the greater the rotary speed the greater the efficiency of the saws, therefore to prevent the centrifugal motion from spreading the saws to more than the desired radius the saws have slots $3^a$ in the rib members to engage pins $8^a$ in spreader head 8 causing all saws to move simultaneously in a true circle and to the desired radius.

Renewable cutter teeth are provided that fit sockets in the frames of saws 3, they are held in place by means passing transversely through the sides of the sockets and through the teeth as provided in my Patent No. 1,351,892 issued Sept. 7, 1920.

Cutter teeth $3^b$ on the periphery are for cutting an annular ring and cutter teeth $3^c$ on the rib are for cutting or breaking off the segments cut so they will drop into muck tank 17.

Spreader head 8 may be any size to spread saws 3 to any desired radius, it should be made in two parts bolted together so as to be readily changed when necessary to change the size of the hole as for instance to enlarge the hole through water bearing strata so that concrete casing may be used as shown in Fig. 1.

Having thus described the construction and operation of the deep well reaming machine, what I claim as new and desire to secure by Letters Patent is.

1. In a machine of the character described the combination of a casing, a sustaining and power conveying means of lowering and holding said casing in a well, power means positioned at the lower end of said casing, a plurality of kerf cutting elements pivotally and operatively attached to said power means, means of spreading and holding said kerf cutting elements to cut an annular ring larger than the previous diameter of the well, tank means attached to the machine below said kerf cutting elements to hold the material cut loose for conveniently lifting to the surface.

2. In a motor advancing deep well reaming machine, the combination of a casing, a sustaining and power conveying cable for lowering and holding said casing in a well; rotary motor means positioned at the bottom of said casing; a plurality of earth cutting saws pivotally attached to said motor means; means of spreading and holding the cutter ends of said saws to a predetermined radius after lowering in the well, means of rotating said motors and attached saws at high speed to efficiently and quickly cut an annular ring larger than the previous diameter of the well for the purposes described.

3. In a deep well reaming machine, the combination of a casing; means of lowering and holding said casing in a well; motor means positioned in the lower part of said casing, a plurality of earth cutting saws pivotally attached thereto, said saws having a face or periphery member with teeth for cutting an annular ring, and a web member diagonally positioned thereto with teeth for cutting out and breaking loose the material within said annular ring for the purposes described.

4. In a machine of the character described; the combination of a plurality of earth cutting rotating saws, slots in said saws, spreader means with pins engaging said slots to hold said saws in a closed position while not rotating, lift plate and screw means of lifting said spreader means when saws rotate at high speed, said pins in spreader means then engaging said slots in saws to prevent centrifugal motion from spreading saws to more than the desired radius; means of substituting larger spreading means when desired to increase the diameter of the hole already reamed for inserting concrete casing and other purposes indicated.

5. In a reaming machine of the character described, the combination of a plurality of kerf cutting elements, high speed motors to which kerf cutting elements are pivotally attached; means of spreading said cutting elements to cut an annular ring larger than the diameter of the hole through which the machine was lowered to provide space for concrete casing in soft strata and other purposes indicated.

6. In a deep well reaming machine of the motor advancing type; the combination of high speed motors a plurality of earth cutting saws pivotally attached to said motors, means of spreading said saws to cut an annular ring and make polygonal shaped holes round; tank means attached to the bottom of said machine to hold the material cut loose for convenient lifting to the surface.

7. In a machine of the character described; the combination of a casing, motors within said casing, saws pivotally attached thereo, a sustaining and power conveying cable; means of holding said casing from rotating in the well; said means consisting of a splined casing fulcrum attached to a suitable holding device, lip clutch means of holding said casing in position in said fulcrum casing; means of releasing said lip clutch when said saws open and operate toothed spring clutch means engaging rack teeth in said fulcrum casing for retarding the gravitating motion of casing, thereby regulating the pressure on cutting elements while working and means of reversing and closing saws and causing lip clutch to again hold casing stationary in fulcrum casing so it may be raised to the surface.

8. In a machine of the character described the combination of a casing, cutting elements positioned just below said casing, a sustaining and power conveying means of holding said casing in the well, a water tank positoined in said casing, a centrally positioned hollow pipe leading from tank down past the said cutting elements, radial holes in said pipe to jet water on to said cutting elements while operating, the lower end of said pipe being made solid, a muck tank supported by lower end of said pipe to receive the material cut loose by said cutting elements for convenient lifting to the surface.

CLYDE S. CORRIGAN.